J. H. GRAVELL.
METHOD OF TREATING ELECTRODES FOR ELECTRIC WELDING.
APPLICATION FILED OCT. 20, 1917.
1,267,400.   Patented May 28, 1918.
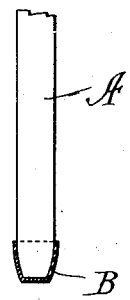
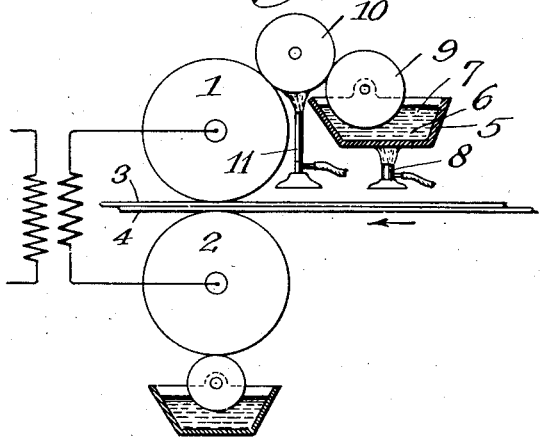
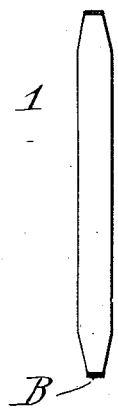
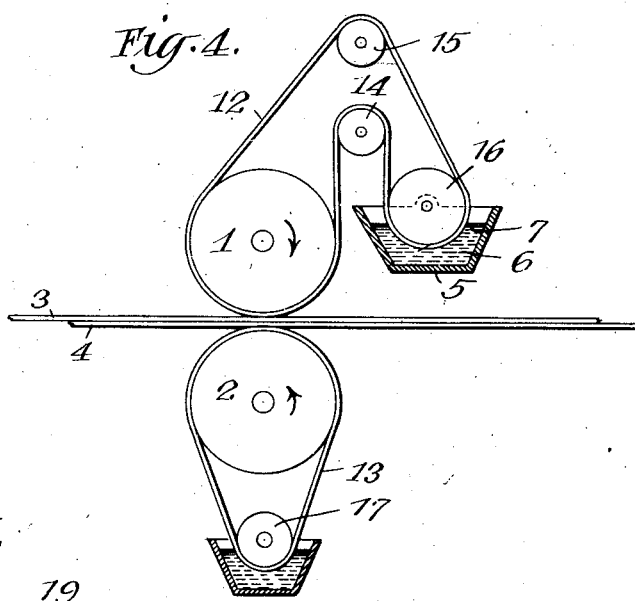
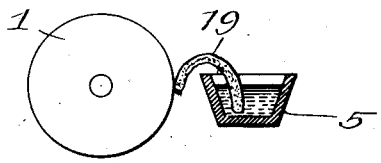
INVENTOR
James H. Gravell
BY
Townsend Decker
ATTORNEYS

UNITED STATES PATENT OFFICE.

JAMES H. GRAVELL, OF BROOKLYN, NEW YORK, ASSIGNOR TO THOMSON SPOT WELDER COMPANY, OF BOSTON, MASSACHUSETTS, A CORPORATION OF MASSACHUSETTS.

METHOD OF TREATING ELECTRODES FOR ELECTRIC WELDING.

1,267,400.   Specification of Letters Patent.   Patented May 28, 1918.

Application filed October 20, 1917. Serial No. 197,543.

*To all whom it may concern:*

Be it known that I, JAMES H. GRAVELL, a citizen of the United States, and a resident of Brooklyn, in the county of Kings and State of New York, have invented certain new and useful Improvements in Methods of Treating Electrodes for Electric Welding, of which the following is a specification.

This invention relates to electric welding and particularly to the method of treating the electrodes used therein. The object of the invention is to produce a method of securing good contact between the work and the electrodes used in resistance welding.

Owing to the relatively poor contact made by the electrodes the metal in contact therewith often becomes "burned," that is melted and oxidized, forming burs, scale, &c., which often attaches itself to the electrodes and interferes with the passage of the current in subsequent welding and results in defective welds. Although this is true in butt welding, it is more noticeable in spot welding and in projection welding and constitutes the greatest defect in the present process of lap or other seam welding.

Many methods have been proposed from time to time to correct this defect in seam welding, such as providing abrazing wheels for cleaning the rollers used in seam welding as electrodes or making the roller act through a strip of metal which can be replaced. All these methods, although more or less effective, have been aimed at repairing the roller after the damage has been done. According to my invention I prevent the damage in the first place and therefore avoid the necessity of cleaning wheels, strips, &c.

Generally stated, the present invention consists in applying a thin coating of a metal with a low melting point to the bearing surface of the electrode. During the welding operation this metal melts or remains liquid over the bearing surface of the electrode and insures it making a contact of very little resistance, preventing overheating of the metal directly in contact with the electrode. This cooling of the metallic surface in contact with the electrode results from two causes; first, owing to the good contact between the electrode and the metal being welded and second, owing to the heat-conducting power of the molten metal which conducts the heat generated at this contact surface into the copper electrode which, owing to the well known electrode cooling methods, never is allowed to attain an objectionable temperature.

Any metal of relatively low melting point will answer my purpose provided it can be made to adhere to the electrodes which are usually made of copper or bronze. In practice I have found that ordinary solder is very satisfactory for my purpose. I have also used mercury with very good results.

In the accompanying drawings Figure 1 is a side elevation and partial section through a spot welding electrode treated in accordance with this invention.

Fig. 2 is a diagrammatic view of one manner of applying a continuous coating in accordance with this invention to roller electrodes as used in seam welding.

Fig. 3 is an edge view of the electrode used in Fig. 2, the coating being shown in section in greatly exaggerated thickness.

Fig. 4 is a diagrammatic view illustrating a modified method of applying the coating in accordance with this invention when used in seam welding.

Fig. 5 illustrates a further modification.

In projection welding where copper blocks are used for electrodes I coat the copper blocks with a metal of low melting point by the usual method of tinning, that is, I clean the blocks with acid and dip them into the liquid metal, using a suitable flux. The same method may be employed in the case of electrodes for butt, spot and seam welding. As a continued use of the electrodes destroys the surface I produce, it is necessary to renew the coating from time to time. In the case of the electrode shown at A in Fig. 1 the coating B, the thickness of which is considerably exaggerated, extends a short distance up the sides of the same but it will be understood that the coating may completely envelop the electrode or only cover the surface which actually contacts with the work.

In the case of seam welding where the electrodes consist of rollers, the surface of fusible metal can, if desired, be supplied continuously as shown in Fig. 2 where 1 and 2 indicate the welding electrodes which are rotated in any suitable manner. 3 and 4 indicate the sheets to be welded together. 5 indicates an open vessel containing the molten metal of low fusing point on top of which is a flux 7. This metal is kept liquid by a source of heat 8. The metal is supplied to the welding roller 1 by a train of rolls 9 and 10. The roller 1 is allowed to attain a proper temperature from the welding current and the roll 10 may be heated from a source indicated at 11. In cases where it is inconvenient or impractical to use a metal which is solid at ordinary temperatures, such as ordinary solder, mercury can be substituted. In this case the sources of heat 8 and 11 can be removed and the flux shown at 7 replaced by dilute nitric acid. To complete the welding operation the electric current is passed from one electrode to the other across the work and pressure applied by means of the roller electrodes, all of which is well known to those skilled in the art.

Fig. 4 shows the method of applying the metal where a welding strip is used. The welding strip is made continuous as shown at 12 and 13. In connection with the upper electrode the strip is kept taut by the rolls 14 and 15 and made to dip into the metal by the roll 16. In connection with the lower electrode the roll 17 keeps the strip taut and also makes it dip into the metal. In this case it is desirable to use mercury as this does not have the objectionable feature of causing the strip to attach itself to the welding roller.

In Figs. 2 and 4 the work is shown as fed between two rollers although it will be understood that but one roller need be used, the other roller being replaced by a traveling mandrel forming a support for the work as is well known and much practised in this art.

It is not always necessary to apply the metal in the metallic state; it may be applied as a dissolved salt which by its chemical action on the roller or welding electrode results in liberating the free metal. For instance, if an aqueous solution of mercuric nitrate be applied to a copper electrode a coating of metallic mercury is produced. Fig. 5 shows this method of producing a coating of metal. 1 indicates the welding roller electrode, 5 indicates the vessel containing a solution of mercuric nitrate, shown at 18. 19 indicates a wick which dips into the solution 18 and carries it to the welding roller. If a welding strip is desired to be used as in Fig. 4, the mercury and dilute nitric acid in the vessel 5 can be replaced by the mercuric nitrate.

The work produced when using electrodes treated by this method is smooth and clean and owing to the fact that the work has no tendency to weld fast to the electrodes, the electrodes last for a much longer time and can be used at a greater speed, thereby cheapening the operation of welding.

It will be understood that various modifications of the invention herein described may be resorted to without departing from the spirit or scope thereof as set forth in the appended claims.

What I claim as my invention is:—

1. The method of treating electrodes for welding consisting in applying a thin layer of fusible metal to their welding surfaces.

2. The method of treating electrodes for welding consisting in treating the electrodes with a fusible metal for the purpose of coating the work contacting surface thereof with a thin layer of fusible metal.

3. The method of treating roller electrodes for seam welding consisting in continuously applying a fusible metal to the work contacting surface of the roller electrode during the welding operation.

4. The method of electric welding consisting in providing a thin layer of fusible metal between the electrode and the surface of the work engaged thereby, passing an electric current through the work by means of said electrode and applying pressure.

5. The method of electric seam welding consisting in continuously applying a coating of fusible metal to the work contacting surface of a roller electrode, passing an electric current through the work and applying pressure.

6. The method of electric seam welding consisting in continuously applying a coating of mercury to the work contacting surface of a roller electrode, passing an electric current through the work and applying pressure.

7. The method of electric seam welding consisting in running an endless strip of metal between the roller contact and the work, continuously applying a fusible metal to said strip, passing an electric current through the work and applying pressure.

8. The method of electric seam welding consisting in continuously feeding a liquid fusible metal between the roller contact and the work, passing an electric current through the roller contact, fusible metal and the work and applying pressure.

9. An electrode for resistance welding consisting of a metallic body having its surface which contacts with the work coated with a metal whose melting point is lower than that of the electrode.

Signed at New York, in the county of New York and State of New York this 19th day of October, A. D. 1917.

JAMES H. GRAVELL.

Witnesses:
F. B. TOWNSEND,
IRENE LEFKOWITZ.